(12) United States Patent
Pfeiffer et al.

(10) Patent No.: US 7,726,436 B2
(45) Date of Patent: Jun. 1, 2010

(54) TORQUE CONTROL ELEMENT FOR A STEERING SYSTEM IN A MOTOR VEHICLE

(75) Inventors: Wolfgang Pfeiffer, Grossbottwar (DE); Werner Mayer, Fellbach (DE); Werner Harter, Illingen (DE); Jochen Koepernik, Schortewitz (DE)

(73) Assignee: Robert Bosch GmbH, Stuttgart (DE)

( * ) Notice: Subject to any disclaimer, the term of this patent is extended or adjusted under 35 U.S.C. 154(b) by 560 days.

(21) Appl. No.: 10/578,338

(22) PCT Filed: Nov. 11, 2004

(86) PCT No.: PCT/EP2004/052917

§ 371 (c)(1),
(2), (4) Date: May 5, 2006

(87) PCT Pub. No.: WO2005/047080

PCT Pub. Date: May 26, 2005

(65) Prior Publication Data

US 2007/0045035 A1 Mar. 1, 2007

(30) Foreign Application Priority Data

Nov. 11, 2003 (DE) ................. 103 52 494

(51) Int. Cl.
*B62D 5/04* (2006.01)
(52) U.S. Cl. .................. 180/405; 180/408; 180/407; 180/411; 180/412; 180/415; 340/465

(58) Field of Classification Search .......... 180/405, 180/408, 407, 411, 412, 413, 415; 340/465
See application file for complete search history.

(56) References Cited

U.S. PATENT DOCUMENTS

| | | | | |
|---|---|---|---|---|
| 5,828,972 | A * | 10/1998 | Asanuma et al. ............... 701/41 |
| 6,041,884 | A * | 3/2000 | Shimizu et al. ............. 180/443 |
| 6,097,286 | A * | 8/2000 | Discenzo ..................... 340/465 |
| 6,208,923 | B1 * | 3/2001 | Hommel ....................... 701/42 |
| 6,548,969 | B2 * | 4/2003 | Ewbank et al. ............... 318/34 |
| 6,776,252 | B1 * | 8/2004 | Andonian et al. ........... 180/402 |
| 6,885,922 | B2 * | 4/2005 | Yao et al. ....................... 701/29 |
| 6,904,346 | B2 * | 6/2005 | Higashi et al. ................ 701/41 |
| 7,130,728 | B2 * | 10/2006 | Suzuki ......................... 701/41 |
| 2002/0166716 | A1 * | 11/2002 | Shimizu et al. ............. 180/446 |
| 2004/0026158 | A1 * | 2/2004 | Rieth et al. ................. 180/402 |
| 2005/0082108 | A1 * | 4/2005 | Husain ....................... 180/402 |

FOREIGN PATENT DOCUMENTS

| | | | |
|---|---|---|---|
| DE | 101 14 600 | * | 3/2002 |
| JP | 2003-529483 | | 10/2003 |

\* cited by examiner

*Primary Examiner*—Faye M. Fleming
*Assistant Examiner*—Marlon A Arce
(74) *Attorney, Agent, or Firm*—Kenyon & Kenyon LLP (57) ABSTRACT

A torque control element for a steering system in a motor vehicle, and such a steering system are provided. The torque control element includes at least two electrical units, each of the electrical units being assigned a separate power supply unit, connected via at least one fuse.

16 Claims, 6 Drawing Sheets

TORQUE CONTROL ELEMENT FOR A STEERING SYSTEM IN A MOTOR VEHICLE

FIELD OF THE INVENTION

The present invention relates to a torque control element for a steering system in a motor vehicle for controlling a steering device, as well as a steering system having a plurality of such torque control elements.

BACKGROUND INFORMATION

Torque control elements are provided for controlling and/or monitoring steering devices of a motor vehicle. In this context, a steering device is understood to be a steering handle such as a steering wheel, on one hand, but also a steered vehicle wheel or a steered vehicle axle. Torque control elements are used as components of electrical or electronic controlled systems for connecting a steering handle and at least one steered vehicle wheel in a motor vehicle. Such electrical or electronic controlled systems are known as steer-by-wire systems, and replace conventional steering systems in which steered vehicle wheels are mechanically coupled to the steering handle.

German Patent Application No. DE 198 334 60 A1 describes a steering system for acting upon or controlling vehicle wheels. In that case, a mechanical passage is always provided from the steering wheel to the wheels to be coupled. The steering system has two subsystems having one process computer each for calculating control tasks, one servomotor each, one reduction gear each and one power output stage each. The two essentially identical subsystems have the task of complementing one another, especially if a fault occurs, so that the steering system remains functional, even in the case of a fault.

Because of the diverse cabling of individual components of the one subsystem to individual components of the other subsystem, the one subsystem is not independent of the other subsystem. As a result, inoperability of one subsystem, even if only partial, may have an effect on the other system, which can lead to impairment or failure of the entire steering system.

German Patent Application No. DE 198 348 70 A1 describes a steer-by-wire system that is subdivided into two diversely redundant systems, having two servomotors, two control units and two diversely redundant process computers. Each of the two process computers receives information about the driving condition or even the setpoint steering angle to be set, via a data channel from a shared higher-ranking vehicle computer. It is further provided that a process computer of the one system is able to switch off the other system in case of a fault. Reciprocal influencing of the two systems is provided in this related art, as well. A fault within the one system can have an effect on the other system, and thus can impair the functioning of the entire steering system.

SUMMARY

An object of the present invention is to provide a torque control element as a component of a steering system, especially a steer-by-wire system, in such a way that the operational reliability of the steering system is ensured.

An example torque control element of the present invention for a steering system in a motor vehicle is used for controlling a steering device. This steering device may be a steering handle, or a steered vehicle wheel or steered vehicle axle. The torque control element includes at least two electrical units, each of the electrical units being assigned a separate power supply unit connected via at least one fuse.

Since the electrical units of the torque control element operate independently of one another, and each has a separate power supply, as well, they do not influence one another. The torque control element remains functional, even if one of the electrical units or one of the power supply units fails.

From this, it advantageously follows that each electrical unit is intrinsically safe and independent. This ensures that electrical units cannot influence each other, especially not disadvantageously. The example torque control element of the present invention accordingly has at least two subsystems. The independence of these at least two subsystems rules out the possibility of a partial or even complete inoperability of one subsystem impairing the operability of another subsystem, and thus the operativeness of the torque control element.

An electrical unit may in each case have a processing unit and an output-stage unit as individual components which cooperate. An electrical unit or an individual component of an electrical unit may be connected to the assigned power supply unit via a supply lead, along which at least one fuse is disposed. Each electrical unit, or even each individual component of an electrical unit can be fuse-protected by this measure. This has the advantage that an individual fault or the switching-off of an individual component within an electrical unit does not result in the other electrical unit being switched off. It is thus ensured that at least one electrical unit is available to a torque control element for transmitting control commands.

In one example embodiment of the torque control element according to the present invention, the electronic processing unit and the output-stage unit of at least one of the electrical units are connected via one of the fuses to the assigned power supply.

At least one sensor for monitoring a steering device is preferably assigned to the processing unit, and at least one actuator for controlling a steering device is assigned to the output-stage unit. This ensures that an electrical unit is able to independently transmit control commands with the aid of an actuator to the steering device. In addition, with the aid of the sensor, the electrical unit is able to monitor the steering device or receive commands from the steering device.

In a further refinement of the present invention, a torque control element is designed as a manual-torque control element for controlling and/or monitoring a steering handle. A torque control element may likewise be designed as a wheel-torque control element for controlling and/or monitoring at least one steered vehicle wheel. The torque control element of the present invention is advantageously able to assume different control and/or monitoring tasks within a steering system.

In one preferred embodiment, an electrical unit may be disposed in a separate housing. If several torque control elements exist within a steering system, e.g., at least two manual-torque control elements and two wheel-torque control elements within a steering system, it is advantageous to accommodate them separately in their own housings. Common-mode errors are avoided particularly easily by this measure. Thus, electrical units cannot impair each other in their operability.

The steering system of the present invention has at least one first and one second torque control element, the first torque control element being used as a manual-torque control element for a steering handle, and the second torque control element being used as a wheel-torque control element for at least one steered wheel.

Naturally, more than two torque control elements may also be provided, so that more than one torque control element is assigned to each steering device.

In the steering system of the present invention, the steering handle and the at least one steered vehicle wheel are typically interconnected via an electrical or electronic controlled system. According to the example embodiment of the present invention, the electrical or electronic controlled system may include the following components: at least one electrical unit for a manual-torque control element, at least one electrical unit for a wheel-torque control element, at least one first power supply unit; at least one second electrical unit for a manual-torque control element, at least one second electrical unit for a wheel-torque control element, and at least one second power supply unit.

In this case, the steering system has a modular design, made up of intrinsically safe and independent electrical units. Both the manual-torque control element and the wheel-torque control element have at least two subsystems. The failure of one electrical unit of one of the two torque control elements does not impair the operability of another electrical unit of the torque control element. Therefore, the operability of a torque control element is not impaired by the failure of one of its at least two subsystems. Moreover, the operability of the entire steering system is not impaired by the failure of one or more subsystems of different torque control elements.

In this context, first electrical units are interconnected with the at least one first power supply unit, and second electrical units are interconnected with the at least one second power supply unit. This provides an additional safeguard for the steering system. The failure of one power supply unit impairs the functioning of only one subsystem or one electrical unit of a torque control element. Other subsystems or electrical units of the torque control element are not affected by it. Therefore, the operability of the whole steering system is not impaired by the failure of one power supply unit.

When working with a steer-by-wire system having two first electrical units connected to a first power supply unit, and two second electrical units connected to a second power supply unit, one first and one second electrical unit each being assigned to the manual-torque control element, and one first and one second electrical unit each being assigned to the wheel-torque control element, the following possibilities present themselves explicitly for the interconnection configuration:

a) two first and second electrical units, respectively, are in each case connected via a supply lead to the first or second power supply unit;

b) a single first or second electrical unit is connected via a separate supply lead to the first or second power supply unit;

c) two identical, individual components, especially two processing units or two output-stage units of the two first or second electrical units are interconnected, and together are connected via a supply lead to the first or second power supply unit;

d) an individual component, especially a processing unit or an output-stage unit of a first or second electrical unit is in each case connected via a supply lead to the first or second power supply unit.

These four example possibilities of the present invention for the interconnection configuration may be combined with one another, so that, for example, first components are interconnected with the first power supply unit differently from the way second components are interconnected with the second power supply unit.

In a further refinement of the steering system, during emergency operation or in response to a failure of the electrical or electronic controlled system, a mechanical coupling of the steering handle to the steered vehicle wheels is made available. This is a precautionary measure, in case the steer-by-wire system of the present invention fails under unfavorable circumstances. During functioning of the steering system in normal operation, a coupling provides for the separation of the mechanical connection between steering handle and steered vehicle wheel or steered vehicle wheels.

It may be provided to accommodate all electrical units in one housing, or the electrical units of one torque control element in one housing. Alternatively, a separate housing may be provided for each electrical unit.

It goes without saying that the features indicated above or yet to be clarified in the following are usable not only in the combination specified in each instance, but also in other combinations or by themselves, without departing from the scope of the present invention.

BRIEF DESCRIPTION OF THE DRAWINGS

The present invention is represented schematically in the figures in light of exemplified embodiments, and is described in detail below with reference to the figures.

DETAILED DESCRIPTION OF EXAMPLE EMBODIMENTS

Figure 1:
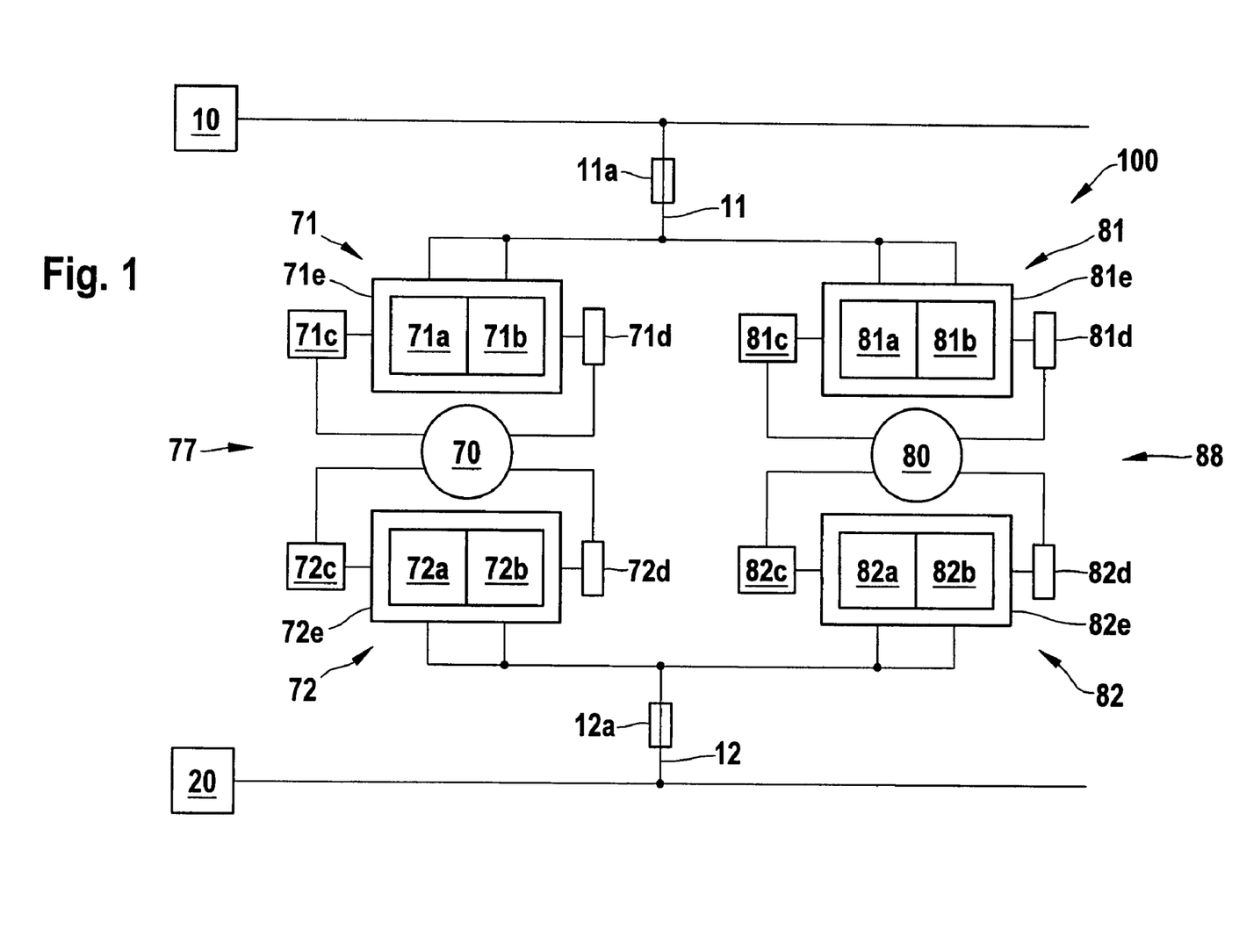
FIG. 1 shows a schematic block diagram for a first variant of the steering system according to the present invention.

FIG. 1 shows a schematic block diagram for a first variant of the steering system according to the present invention. All the following six example embodiments are built on this variant shown in FIG. 1. In this context, without restricting the universality, identical or substantially identical components of the steering system which are portrayed in all six figures are provided with identical reference numerals.

The steering systems illustrated in FIGS. 1 through 6 for motor vehicles have an electrical or electronic controlled system, a steer-by-wire system 100, 200, 300, 400, 500, 600. Such a steer-by-wire system 100, 200, 300, 400, 500, 600, here in a schematic view, is used for the connection between a steering handle 70 and at least one steered vehicle wheel 80 or a steered vehicle axle. In the six variants from the following FIGS. 1 through 6, the electrical units are designated as sub-/semi-control devices 71, 72, 81, 82.

A manual-torque control element 77 is assigned to steering handle 70; a wheel-torque control element 88 is assigned to the at least one steered vehicle wheel 80. At least one vehicle axle has at least one vehicle wheel 80. A vehicle axle has at least one wheel-torque control element 88 for the control.

Wheel-torque control element 88 may be designed to act upon both vehicle wheels of a vehicle axle. In another example embodiment of the present invention, it may be provided to assign each vehicle wheel 80 a wheel-torque control element 88 for the control or monitoring, so that each vehicle wheel 80 may be steered individually. Manual-torque control element 77 is made up of a first sub-/semi-control device 71 and a second sub-/semi-control device 72. Correspondingly, wheel-torque control element 88 includes a first sub-/semi-control device 81 and a second sub-/semi-control device 82.

Each sub-/semi-control device 71, 72, 81, 82 has the following individual components: a processing unit 71a, 72a, 81a, 82a and an output-stage unit 71b, 72b, 81b, 82b. Processing unit 71a, 72a, 81a, 82a of a sub-/semi-control device 71, 72, 81, 82 is connected to output-stage unit 71b, 72b, 81b, 82b of the same sub-/semi-control device 71, 72, 81, 82. In addition, a sensor 71c, 72c, 81c, 82c is assigned to each sub-/semi-control device 71, 72, 81, 82 or each processing unit 71a, 72a, 81a, 82a.

Sensors 71c, 72c, 81c, 82c are designed to monitor the torque control elements, e.g., manual-torque control element 70 or wheel-torque control element 80. In addition, an actuator 71d, 72d, 81d, 82d is assigned to each sub-/semi-control device 71, 72, 81, 82 or each output-stage unit 71b, 72b, 81b, 82b. Actuators 71d, 72d, 81d, 82d are designed to control or act upon the torque control elements. Additionally, in the case of all six variants, each sub-/semi-control device 71, 72, 81, 82 or its individual components, processing unit 71a, 72a, 81a, 82a as well as output-stage unit 71b, 72b, 81b, 82b, are accommodated in a separate housing 71e, 72e, 81e, 82e.

The two first sub-/semi-control devices 71, 81 or their individual components, processing unit 71a, 81a and output-stage unit 71b, 81b, respectively, are connected by suitable interconnection or supply leads to a first power supply unit 10 which supplies them with electrical energy. Analogously, the two second sub-/semi-control devices 72, 82 or their individual components, processing unit 72a, 82a and output-stage unit 72b, 82b, respectively, are connected by suitable interconnection or supply leads to a second power supply unit 20 which supplies them with electrical energy. In all six variants of the steering system or steer-by-wire system 100, 200, 300, 400, 500, 600 of the present invention shown in FIGS. 1 through 6, first power supply unit 10 is independent of second power supply unit 20. First sub-/semi-control devices 71, 81 therefore operate independently of second sub-/semi-control devices 72, 82.

Mutually independent power supply units 10, 20 deliver the same electric voltage value or different voltage values. For example, a value for the voltage of first power supply unit 10 is 42 V; a value for the voltage of second power supply unit 20 is 14 V, for instance.

A possible, even only partial failure of first sub-/semi-control device 71 can be compensated for by second sub-/semi-control device 72 and vice versa. In spite of the functional impairment of one of the two sub-/semi-control devices 71, 72, steering signals of manual-torque control element 77 are reliably further processed by the respective other sub-/semi-control device. Correspondingly, a possible, even only partial failure of first sub-/semi-control device 81 is compensated for by second sub-/semi-control device 82 and vice versa. In spite of the functional impairment of one of the two sub-/semi-control devices 81, 82, steering signals for wheel-torque control element 88 are reliably further processed by the respective other sub-/semi-control device. Each steer-by-wire system 100, 200, 300, 400, 500, 600 is made up of four intrinsically safe and independent sub-/-semi-systems 71, 72, 81, 82 having their own sensor system and actuator system.

The six figures show six different variants for the arrangement of supply leads and fuses, respectively. Combinations of different variants or individual features of different variants are quite possible.

In the first variant of steer-by-wire system 100 of the present invention shown in FIG. 1, first sub-/semi-control devices 71, 81 are connected via a shared supply lead 11 to first power supply unit 10. A fuse 11a is situated in supply lead 11. Second sub-/semi-control devices 72, 82 are connected via a shared supply lead 12 to second power supply unit 20. A fuse 12a is situated in supply lead 12. Two first or second sub-/semi-control devices 71, 81 or 72, 82 each are connected via a fuse 11a, 12a to first or second power supply 10 or 20. The two supply connections of processing unit and output-stage unit 71a, 71b; 81a, 81b; 72a, 72b; 82a, 82b are connected to each other within one sub-/semi-control device 71, 81, 72, 82.

Figure 2:
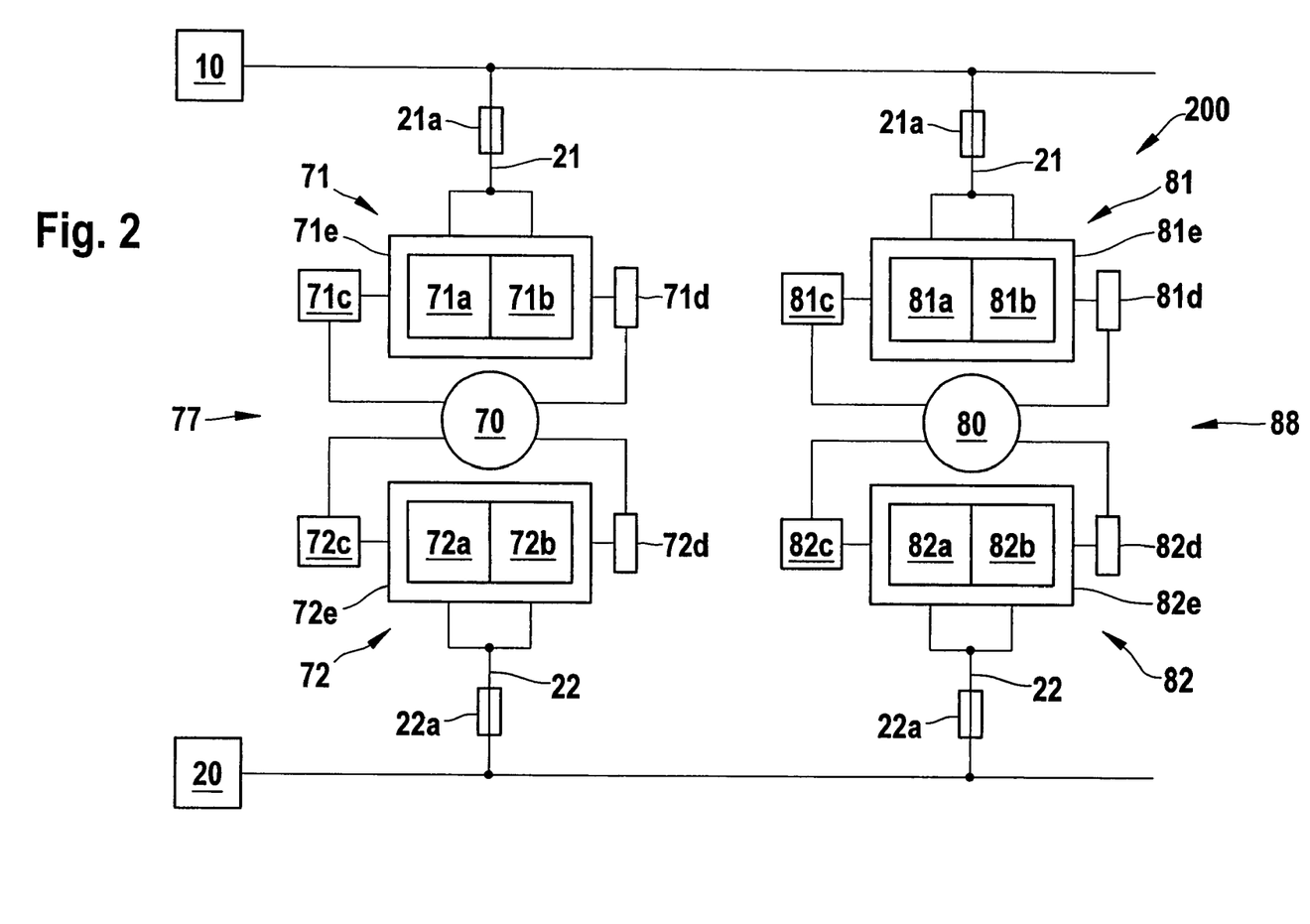
FIG. 2 shows a schematic block diagram for a second variant of the steering system according to the present invention.

In the second variant of a steer-by-wire system 200 shown in FIG. 2, each first sub-/semi-control device 71, 81 is connected via a separate supply lead 21 to first power supply unit 10. A fuse 21a is situated in supply lead 21. Each second sub-/semi-control device 72, 82 is connected via a separate supply lead 22 to second power supply unit 20. A fuse 22a is situated in supply lead 22. This means that each sub-/semi-control device 71, 81, 72, 82, made up of a processing unit 71a, 81a, 72a, 82a, an output-stage unit 71b, 81b, 72b, 82b, a sensor 71c, 81c, 72c, 82c, as well as an actuator 71d, 81d, 72d, 82d has its own fuse 21a, 22a, and is therefore independent.

Figure 3:
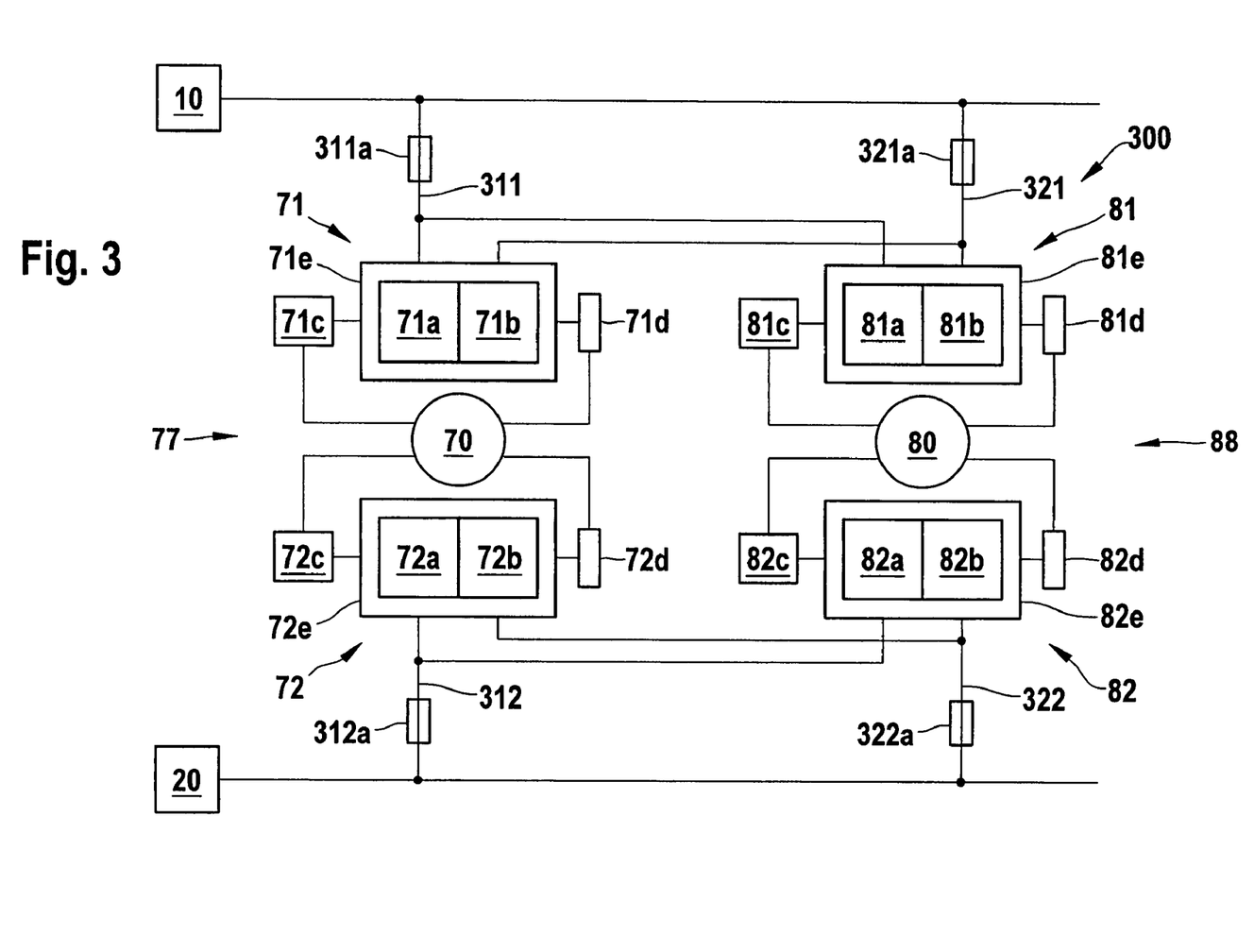
FIG. 3 shows a schematic block diagram for a third variant of the steering system according to the present invention.

In the third variant of a steer-by-wire system 300 shown in FIG. 3, the two first processing units 71a, 81a of first sub-/semi-control devices 71, 81 are wired to each other, and are connected to first power supply unit 10 via a supply lead 311 in which a fuse 311a is situated. In the same way, the two second processing units 72a, 82a of second sub-/semi-control devices 72, 82 are wired to each other, and are connected to second power supply unit 20 via a supply lead 312 in which a fuse 312a is situated.

Correspondingly, the two first output-stage units 71b, 81b of first sub-/semi-control devices 71, 81 are wired to each other, and are connected to first power supply unit 10 via a supply lead 321 in which a fuse 321a is situated. In the same way, the two second output-stage units 72b, 82b of second sub-/semi-control devices 72, 82 are wired to each other, and are connected to second power supply unit 20 via a supply lead 322 in which a fuse 322a is situated.

A processing unit 71a, 72a of manual-torque control element 70, as well as a processing unit 81a, 82a of wheel-torque control element 80 are connected either to first power supply unit 10 or to second power supply unit 20 via a shared fuse 311a, 312a. In the same way, an output-stage unit 71b, 72b of manual-torque control element 70, as well as an output-stage unit 81b, 82b of wheel-torque control element 80 are connected either to first power supply unit 10 or to second power supply unit 20 via a shared fuse 321a, 322a.

Figure 4:
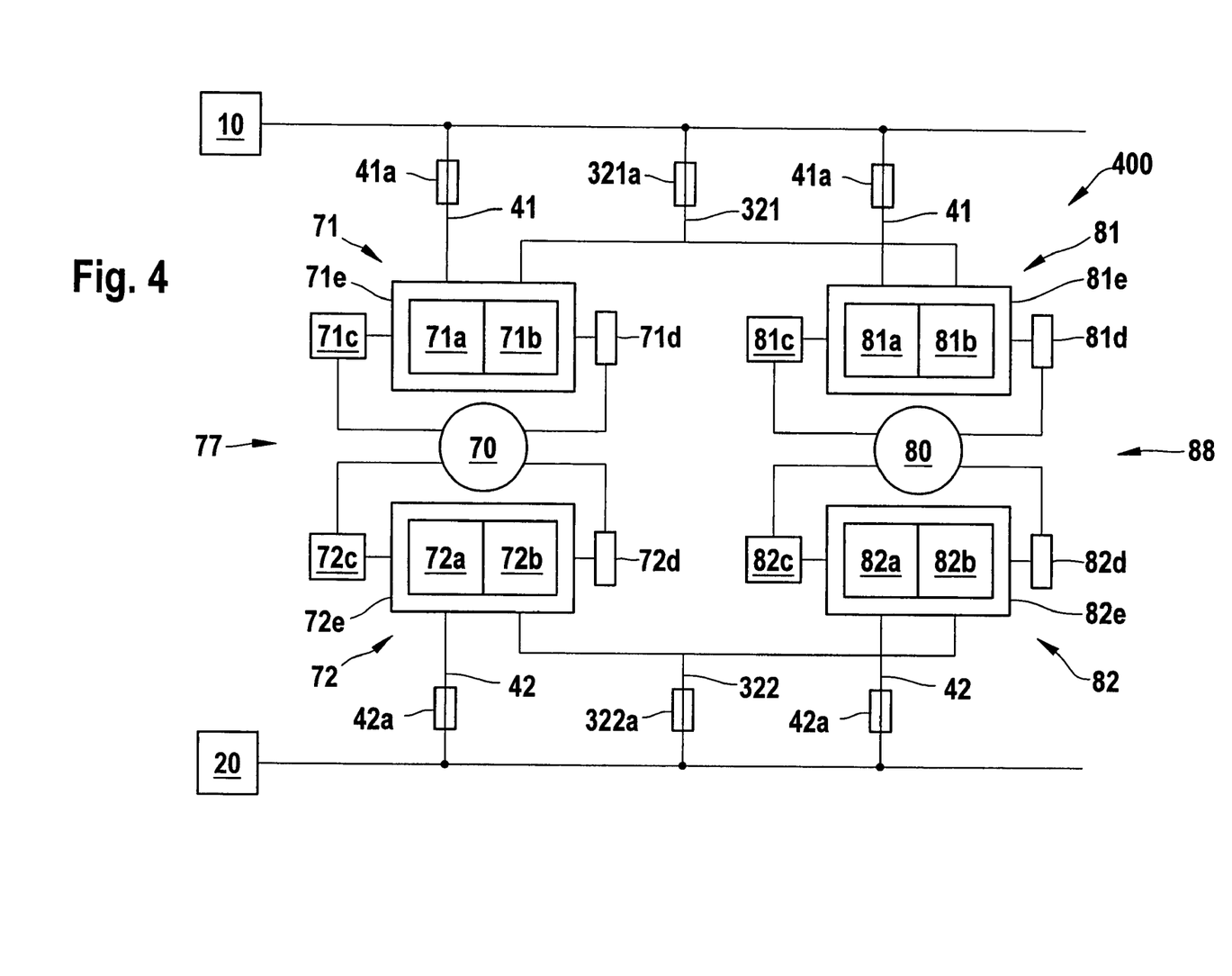
FIG. 4 shows a schematic block diagram for a fourth variant of the steering system according to the present invention.

In the fourth variant of a steer-by-wire system 400 shown in FIG. 4, in each case a first processing unit 71a, 81a of first sub-/semi-control devices 71, 81 is connected to first power supply unit 10 via a supply lead 41 in which a fuse 41a is situated. The two first output-stage units 71b, 81b of the two first sub-/semi-control devices 71, 81 are wired to each other, and are connected to first power supply unit 10 via a supply lead 321 in which a fuse 321a is situated.

Correspondingly, in each case a second processing unit 72a, 82a of second sub-/semi-control devices 72, 82 is connected to second power supply unit 20 via a supply lead 42 in which a fuse 42a is situated. The two second output-stage units 72b, 82b of the two second sub-/semi-control devices 72, 82 are wired to each other, and are connected to second power supply unit 20 via a supply lead 322 in which a fuse 322a is situated. Each processing unit 71a, 81a, 72a, 82a is connected via a separate fuse 41a, 42a either to first or second power supply unit 10, 20. Two output-stage units 71b, 72b; 81b, 82b, one each of manual-torque control element and wheel-torque control element 70, 80, are connected either to first or second power supply unit 10, 20 via a shared fuse 311a, 312a.

Figure 5:
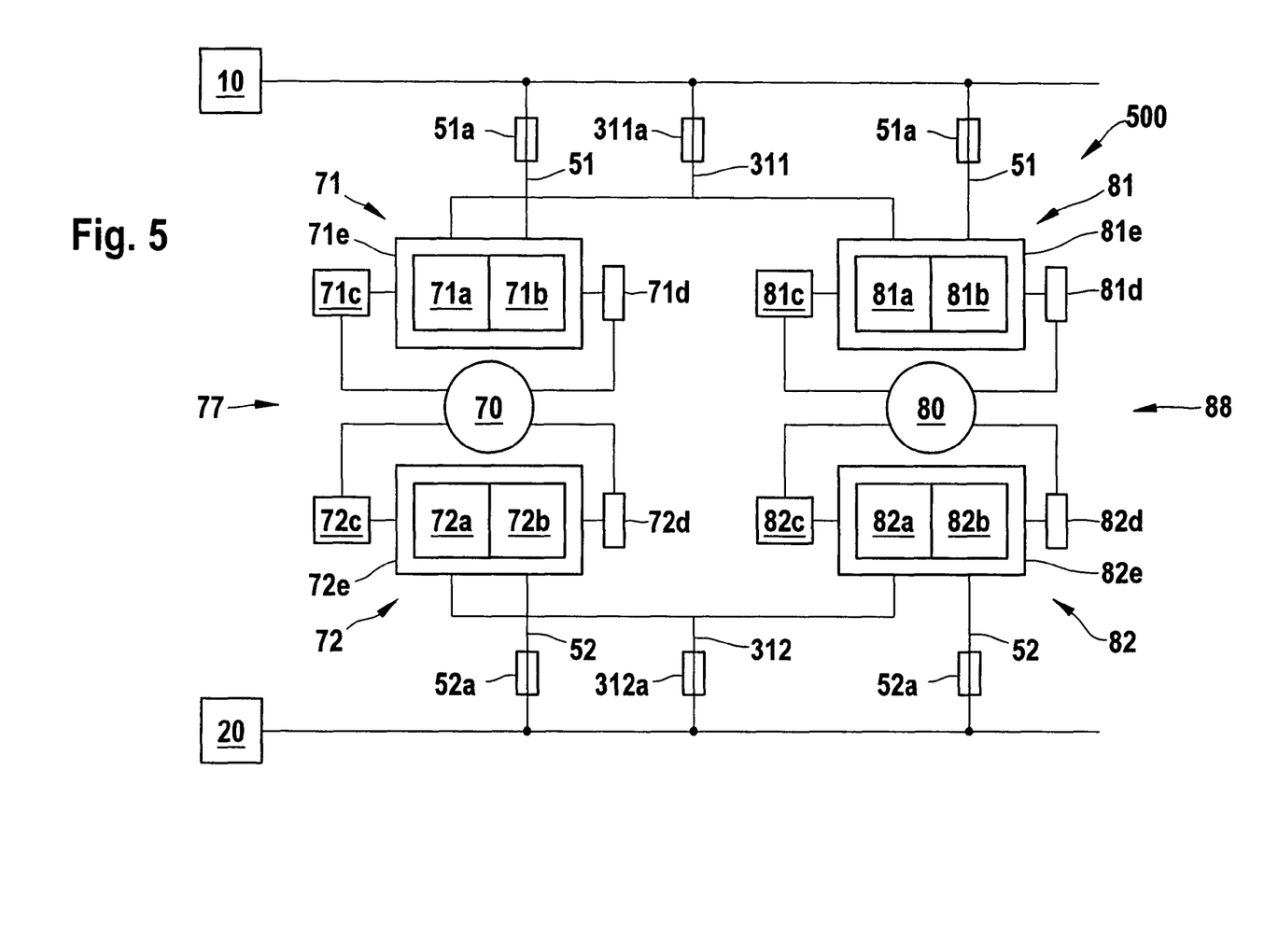
FIG. 5 shows a schematic block diagram for a fifth variant of the steering system according to the present invention.

In the fifth variant of a steer-by-wire system 500 shown in FIG. 5, in each case a first output-stage unit 71b, 81b of first sub-/semi-control devices 71, 81 is connected to first power supply unit 10 via a supply lead 51 in which a fuse 51a is situated. The two first processing units 71a, 81a of the two first sub-/semi-control devices 71, 81 are wired to each other, and are connected to first power supply unit 10 via a supply lead 311 in which a fuse 311a is situated.

Correspondingly, in each case a second output-stage unit 72b, 82b of second sub-/semi-control devices 72, 82 is connected to second power supply unit 20 via a supply lead 52 in which a fuse 52a is situated. The two second processing units 72a, 82a of the two second sub-/semi-control devices 72, 82 are wired to each other, and are connected to second power supply unit 20 via a supply lead 312 in which a fuse 312a is situated. Two processing units 71a, 72a; 81a, 82a, one each of manual-torque control element and wheel-torque control element 70, 80, are connected to first or second power supply unit 10, 20 via a shared fuse 311a, 312a. Each output-stage unit 71b, 81b, 72b, 82b is connected to first or second power supply unit 10, 20 via a separate back-up fuse 51a, 52a.

Figure 6:
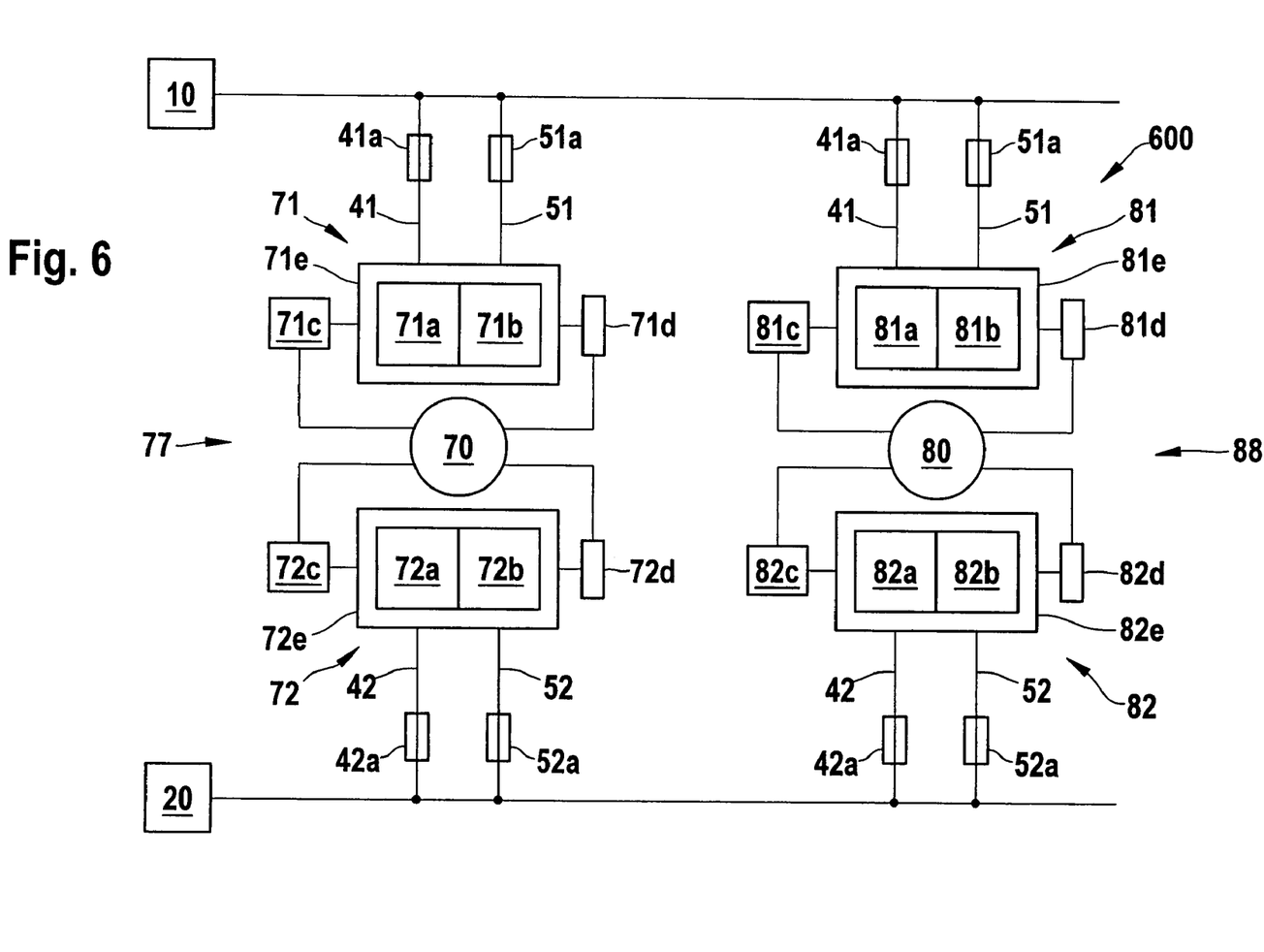
FIG. 6 shows a schematic block diagram for a sixth variant of the steering system according to the present invention.

In the sixth variant of a steer-by-wire system 600 shown in FIG. 6, each individual component of first sub-/semi-control devices 71, 81, i.e., each first processing unit 71a, 81a is connected to first power supply unit 10 via in each instance a separate supply lead 41 in which a fuse 41a is situated; and each first output-stage unit 71b, 81b is connected to first power supply unit 10 via a separate supply lead 51 in which a fuse 51a is situated.

Correspondingly, each individual component of second sub-/semi-control devices 72, 82, i.e., each second processing unit 72a, 82a is connected to second power supply unit 20 via in each instance a separate supply lead 42 in which a fuse 42a is situated; and each second output-stage unit 72b, 82b is connected to second power supply unit 20 via a separate supply lead 52 in which a fuse 52a is situated.

The variants of steer-by-wire system 300, 400, 500, 600 shown in FIGS. 3 through 6 have the advantage that processing unit and output-stage unit 71a, 71b, 81a, 81b, 72a, 72b; 82a, 82b are protected by fuse separately within one sub-/semi-control device 71, 81, 72, 82. In this manner, in spite of a short circuit in one output stage 71b, 81b, 72b, 82b, for example, and triggering of corresponding fuse 321a, 322a, 51a, 52a associated with it, it is possible to address associated processing unit 71a, 81a, 72a, 82a and to diagnose the output-stage fault.

What is claimed is:

1. A torque control element for a steering system in a motor vehicle, for controlling a steering device, comprising:
   at least two electrical units; and
   power supply units, each of the electrical units being assigned a respective one of power supply units, and each being connected via at least one fuse, wherein the at least two electrical units operate independently of one another;
   wherein:
      at least one of the electrical units includes a processing unit and an output-stage unit which cooperate with each other,
      the processing unit and the output-stage unit of at least one of the electrical units are connected in each case via one of the fuses to the power supply unit assigned to the electrical unit, and
      at least one sensor configured to monitor a steering device is assigned to the processing unit, and at least one actuator configured to control the steering device is assigned to the output-stage unit.

2. The torque control element as recited in claim 1, wherein the torque control element is a manual-torque control element for at least one of controlling and monitoring a steering handle.

3. The torque control element as recited in claim 1, wherein the torque control element is a wheel-torque control element for at least one of controlling and monitoring at least one steered vehicle wheel.

4. A steering system, comprising:
   a first and a second torque control element, each of the first and second torque control elements including at least two electrical units; and
   power supply units, each of the electrical units being assigned a respective one of power supply units, and each being connected via at least one fuse;
   wherein the first torque control element is a manual-torque control element for a steering handle, and the second torque control element is a wheel-torque control element for at least one steered vehicle wheel, and
   wherein all electrical units are accommodated in a single housing.

5. The steering system as recited in claim 4, wherein the steering handle and the at least one steered vehicle wheel are connected to each other via an electronic controlled system.

6. The steering system as recited in claim 4, wherein the steering system makes a mechanical coupling of the steering handle to the steered vehicle wheels available in the event the electronic controlled system fails.

7. A steering system, comprising:
   a first and a second torque control element, each of the first and second torque control elements including at least two electrical units; and
   power supply units, each of the electrical units being assigned a respective one of power supply units, and each being connected via at least one fuse;
   wherein the first torque control element is a manual-torque control element for a steering handle, and the second torque control element is a wheel-torque control element for at least one steered vehicle wheel, and
   wherein the electrical units of each torque control element are accommodated in one housing.

8. A steering system, comprising:
   a first and a second torque control element, each of the first and second torque control elements including at least two electrical units; and
   power supply units, each of the electrical units being assigned a respective one of power supply units, and each being connected via at least one fuse;
wherein the first torque control element is a manual-torque control element for a steering handle, and the second torque control element is a wheel-torque control element for at least one steered vehicle wheel, and
   wherein each of the electrical units is accommodated in a separate housing.

9. A steering system, comprising:
   a first and a second torque control element, each of the first and second torque control elements including at least two electrical units; and power supply units, each of the electrical units being assigned a respective one of power supply units, and each being connected via at least one fuse;

wherein the first torque control element is a manual-torque control element for a steering handle, and the second torque control element is a wheel-torque control element for at least one steered vehicle wheel, and wherein at least one of the electrical units includes a processing unit and an output-stage unit which cooperate with each other.

10. The steering system as recited in claim 9, wherein the processing unit and the output-stage unit of at least one of the electrical units are connected in each case via one of the fuses to the power supply unit assigned to the electrical unit.

11. The steering system as recited in claim 9, wherein at least one sensor configured to monitor a steering device is assigned to the processing unit, and at least one actuator configured to control the steering device is assigned to the output-stage unit.

12. The steering system as recited in claim 4, wherein the torque control element is a manual-torque control element for at least one of controlling and monitoring a steering handle.

13. The steering system as recited in claim 4, wherein the torque control element is a wheel-torque control element for at least one of controlling and monitoring at least one steered vehicle wheel.

14. A steering system, comprising:
a first and a second torque control element, each of the first and second torque control elements including at least two electrical units; and
power supply units, each of the electrical units being assigned a respective one of power supply units, and each being connected via at least one fuse;

wherein the first torque control element is a manual-torque control element for a steering handle, and the second torque control element is a wheel-torque control element for at least one steered vehicle wheel;

wherein:
at least one of the electrical units includes a processing unit and an output-stage unit which cooperate with each other, the processing unit and the output-stage unit of at least one of the electrical units are connected in each case via one of the fuses to the power supply unit assigned to the electrical unit, and at least one sensor configured to monitor a steering device is assigned to the processing unit, and at least one actuator configured to control the steering device is assigned to the output-stage unit.

15. The steering system as recited in claim 14, wherein the torque control element is a manual-torque control element for at least one of controlling and monitoring a steering handle.

16. The steering system as recited in claim 14, wherein the torque control element is a wheel-torque control element for at least one of controlling and monitoring at least one steered vehicle wheel.

* * * * *